United States Patent [19]

Paarmann

[11] Patent Number: 4,535,979

[45] Date of Patent: Aug. 20, 1985

[54] ALIGNMENT TOOL FOR PIECE WORK

[76] Inventor: James Paarmann, R.R. 2, Box 1, Girard, Kans. 66743

[21] Appl. No.: 569,305

[22] Filed: Jan. 9, 1984

[51] Int. Cl.³ ............................................. B25B 1/20
[52] U.S. Cl. ...................................... 269/45; 269/60; 269/71; 269/75
[58] Field of Search .................. 269/60, 71, 73, 45, 269/75

[56] References Cited

U.S. PATENT DOCUMENTS 3,527,454 9/1970 Humm .................................. 269/45
4,070,011 1/1978 Glesser ................................ 269/45
4,317,560 3/1982 Troyer ................................. 269/71

Primary Examiner—Robert C. Watson
Attorney, Agent, or Firm—Kokjer, Kircher, Bradley, Wharton, Bowman & Johnson

[57] ABSTRACT

A work piece holder for aligning two work pieces. The holder comprises a framework to which are mounted in opposed relationship two stanchions. Mounted on each stanchion is an arm having means for holding a work piece. The arms are mounted in a manner which allows calibrated movement along three axes, the first being generally horizontal, the second being transverse to the first, and the third being transverse to the second, resulting in the ability to precisely align the two work pieces.

7 Claims, 5 Drawing Figures

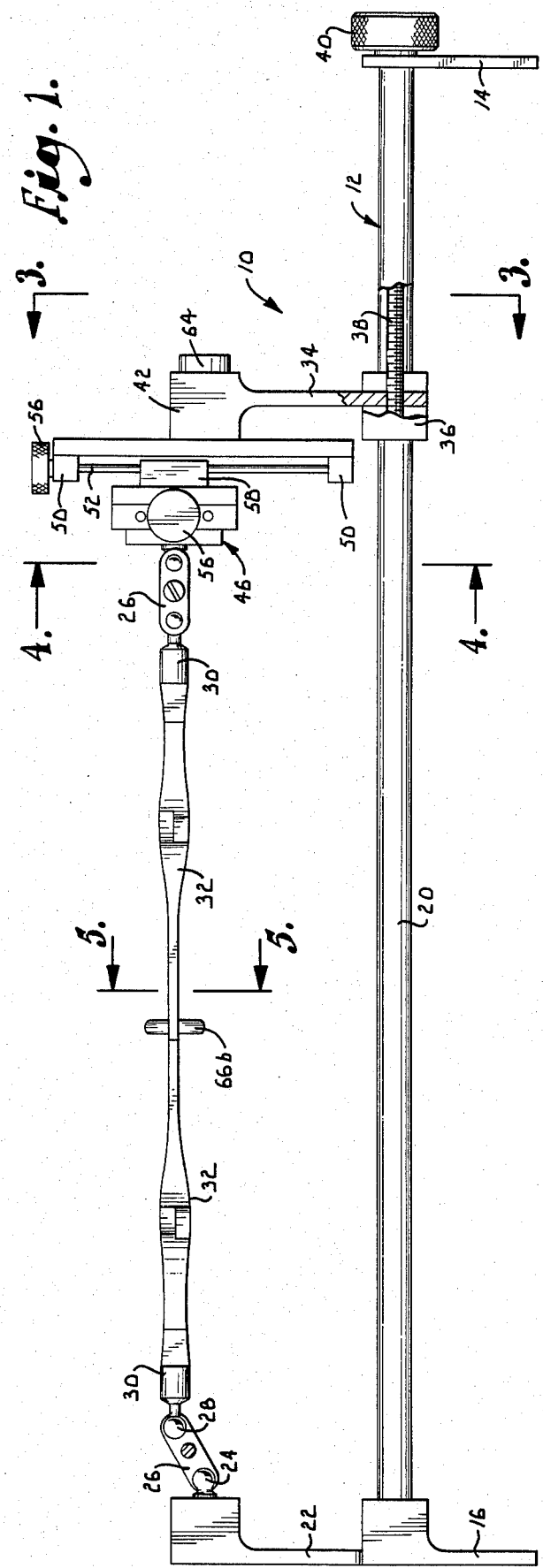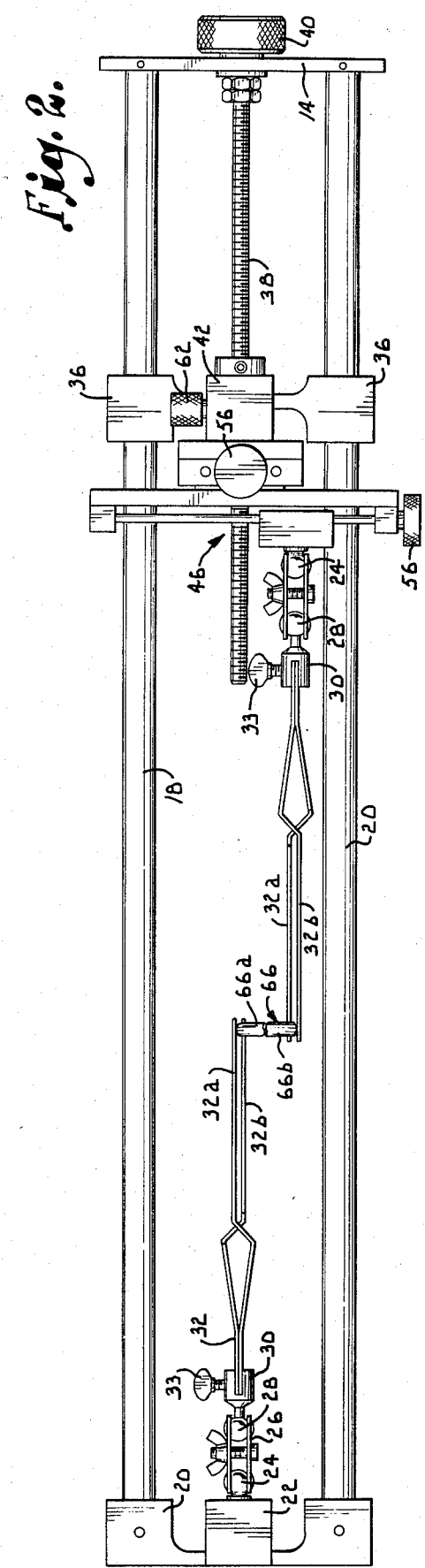

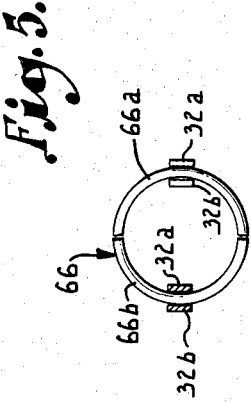
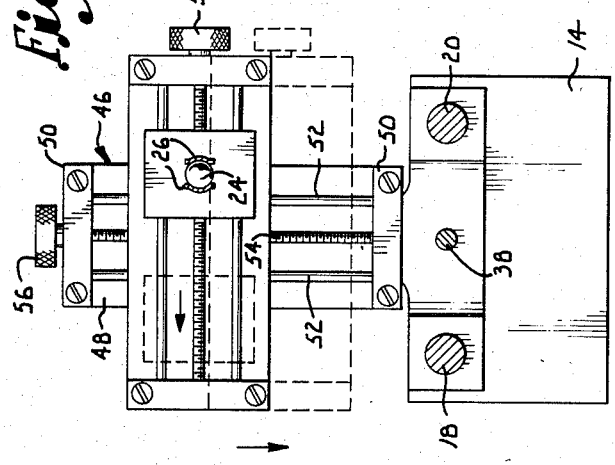
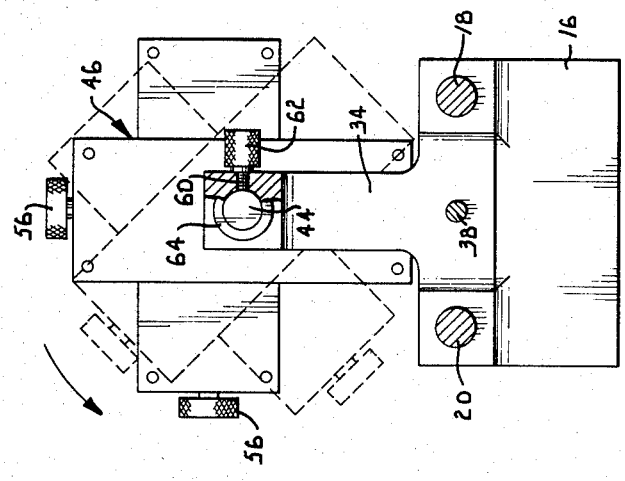

ALIGNMENT TOOL FOR PIECE WORK

BACKGROUND AND SUMMARY OF THE INVENTION

This invention relates generally to alignment tools and, more particularly, to a tool for aligning two work pieces for a subsequent operation.

Various types of tools have long existed for holding items together. These have included articulated arms and other calibrated, movable work piece holders. Especially in the jewelry industry, but also in other fields where fine precision work is done, it is necessary to bring two work pieces together with precise accuracy.

The present invention provides an alignment tool which includes two articulated arms. Both arms are movable about a double articulated universal joint and one of the arms is also movable along three intersecting axes.

OBJECTS OF THE INVENTION AND DESCRIPTION OF THE DRAWINGS

It is, therefore, a primary object of the present invention to provide a work piece holder especially adapted for bringing two relatively small objects such as jewelry pieces into alignment.

Another objective of my invention is to provide a work piece holder as set forth in the foregoing object which is characterized by two movable arms both of which are articulated about universal joints.

A primary aim of the invention is to provide a work piece holder meeting the foregoing objects wherein at least one of the arms is movable about three different axes.

It is also a very important aim of this invention to provide a work piece holder as aforedescribed wherein the three axes mentioned are each presented by a threaded member thereby accommodating precise calibrated movement along any one axis.

Other objects of the invention will be made clear or become apparent from the following description and claims when read in light of the accompanying drawings wherein:

FIG. 1 is a side elevational view of the tool according to the present invention;

FIG. 2 is a top plan view of the tool shown in FIG. 1;

FIG. 3 is a vertical cross-sectional view taken along line 3—3 of FIG. 1;

FIG. 4 is a vertical cross-sectional view taken along 4—4 of FIG. 1; and

FIG. 5 is a vertical cross-sectional view taken along 5—5 of FIG. 1.

DETAILED DESCRIPTION OF THE INVENTION

Referring initially to FIG. 1, the alignment tool of the invention is designated generally by the numeral 10. Tool 10 includes an elongated framework 12 comprising end walls 14 and 16 that are coupled together by elongated parallel rods 18 and 20.

Mounted at one end of framework 12 and integral with end wall 16 is a first upright stanchion 22 to which is rigidly secured a ball head 24. An adjustable clamp 26 engages ball head 24 and also a second ball head 28 that is rigid with a bifurcated holder 30. Holder 30 receives a first elongated arm 32 having first and second movable fingers 32a and 32b that are biased toward one another. A set screw 33 secures the arm to holder 30.

Mounted in opposed relationship to stanchion 22 is a second stanchion 34 having block-like feet 36 that are slideably received by rods 18 and 20. The base of stanchion 34 threadably receives an elongated threaded stud 38 that is rotatably received at the opposite end by end wall 14. Knurled knob 40 is rigid with stud 38 for rotating the latter. The upper portion of stanchion 34 presents a housing 42 which rotatably receives an arm 44 that is rigid with a mounting bracket designated generally by the numeral 46.

The construction of bracket 46 is best illustrated in FIG. 4. A plate 48 is rigid with arm 44 and two end pieces 50 are rigidly secured to this plate in perpendicular relationship to the latter. Elongated guide rods 52 extend between end pieces 50 and are received by the latter as is an elongated threaded screw 54. Screw 54 is rotatably received by the end pieces and a knurled knob 56 is rigid with the screw for turning the latter. As best illustrated in FIG. 1, screw 54 is threadably received by a mounting block 58 best shown in FIG. 1.

Mounting block 58 is rigid with a second mounting bracket 46 identical to the bracket previously described although oriented perpendicular to the first-mentioned bracket. The second mounting block 58 is rigid with a second ball head 24 (FIG. 4) and a second clamp 26 mounts another ball head 28 that is rigid with a second holder 30. A second elongated arm 32 is received by the second holder 30 as previously described for the first arm 32. A threaded stud 60 (FIG. 3) is threadably received by housing 42 and is rotatable by turning the enlarged knurled end 62. Engagement of stud 60 with arm 44 holds the latter against rotation. A collar 64 that is rigid with arm 44 precludes movement of the arm through housing 42.

Operation of the tool 10 is illustrated in the drawings is conjunction with a ring 66 that is broken into two pieces 66a and 66b. The two pieces are held by fingers 32a and 32b or the arms 32. The two ball heads 24 and 28 in combination with clamps 26 present double articulated universal joints which will accommodate movement of the arms in any direction. The arms are positioned to bring the two pieces 66a and 66b into approximate alignment and knob 40 is turned, if necessary, to move stanchion 34 longitudinally along a first axis relative to stationery stanchion 22, the first axis being defined by stud 38. A final precise alignment is accomplished by turning knobs 56 on the two mounting brackets 46. Each of screws 54 defines an axis for moving the second arm 32 which axes are transverse to each other and also to the axis of stud 38. In this regard, it is to be kept in mind that mounting bracket 46 is rotatable relative to stanchion 34 by loosening stud 60 so that the orientation of the two axes defined by screws 54 may be varied relative to the axis of stud 38.

By utilizing the tool in the aforedescribed manner, precise accurate alignment of two work pieces is accomplished with minimal effort. Subsequent operations such as soldering, metal working or cutting can be performed with the two work pieces held precisely by the two arms. While the invention has been described with reference to working on small items such as jewelry, it will be appreciated that the device could be adapted to a larger scale so as to accommodate working on larger items.

I claim:

1. A tool for aligning two work pieces, said tool comprising:
- a rigid framework presenting an elongate guide structure having a substantially horizontal orientation to define a first horizontal axis;
- a first elongated arm mounted on said framework at a location above said guide member, said first arm having means for holding one of the work pieces;
- stanchion means extending upwardly from said guide structure and mounted thereon for linear movement along the length thereof to travel along said first axis generally toward and away from said first arm;
- a first bracket mounted on said stanchion means at a location above said guide structure for movement along same with the stanchion means, said first bracket presenting a second axis oriented perpendicular to said first axis;
- a second bracket mounted on said first bracket for linear movement relative thereto along said second axis, said second bracket presenting a third axis oriented perpendicular to both said first and second axes;
- a second elongated arm having means for holding the other work piece; and
- means for mounting said second arm on said second bracket for linear movement relative thereto along said third axis.

2. The tool of claim 1, wherein said guide structure includes a pair of parallel guide members each having an elongate shape.

3. The tool of claim 1, including a universal joint connecting said first arm with the framework.

4. The tool of claim 3, wherein said mounting means includes another universal joint connecting said second arm with said second bracket.

5. The tool of claim 1, wherein said second axis is defined by a pair of parallel guide rods on said first bracket.

6. The tool of claim 5, wherein said third axis is defined by a pair of parallel guide rods or said second bracket.

7. The tool of claim 6, wherein said guide structure comprises a pair of parallel guide rods on said framework.

* * * * *